United States Patent
Mu

(10) Patent No.: US 12,407,453 B2
(45) Date of Patent: Sep. 2, 2025

(54) HYBRID AUTOMATIC REPEAT REQUEST (HARQ) TRANSMISSION METHOD AND APPARATUS

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 860 days.

(21) Appl. No.: 17/622,293

(22) PCT Filed: Jun. 27, 2019

(86) PCT No.: PCT/CN2019/093287
§ 371 (c)(1),
(2) Date: Dec. 23, 2021

(87) PCT Pub. No.: WO2020/258162
PCT Pub. Date: Dec. 30, 2020

(65) Prior Publication Data
US 2022/0247521 A1  Aug. 4, 2022

(51) Int. Cl.
*H04L 1/1829* (2023.01)
*H04L 5/00* (2006.01)
*H04W 52/02* (2009.01)

(52) U.S. Cl.
CPC .......... *H04L 1/1861* (2013.01); *H04L 5/0055* (2013.01); *H04W 52/0235* (2013.01)

(58) Field of Classification Search
CPC ... H04L 1/1861; H04L 5/0055; H04L 5/0094; H04L 1/1854; H04L 5/0046; H04L 1/1812; H04W 52/0235; Y02D 30/70

USPC ................... 370/311; 455/343.2–343.5, 571
See application file for complete search history.

(56) References Cited

U.S. PATENT DOCUMENTS

| 2014/0146720 A1* | 5/2014 | Tang | H04W 72/23 370/280 |
| 2020/0229098 A1* | 7/2020 | Cheng | H04W 52/0248 |
| 2022/0217678 A1* | 7/2022 | Yoshioka | H04W 72/02 |

FOREIGN PATENT DOCUMENTS

EP   3213563 B1   11/2018

OTHER PUBLICATIONS

Indian Patent Application No. 202247003082, Office Action dated Jun. 10, 2022, 7 pages.
Indian Patent Application No. 202247003082 Office Action dated Mar. 18, 2024, 2 pages.
Qualcomm Incorporated "PDCCH-based power saving channel design", 3GPP TSG-RAN WG1 #97, R1-1907294, May 2019, 16 pages.

* cited by examiner

*Primary Examiner* — Michael Y Mapa
(74) *Attorney, Agent, or Firm* — Cozen O'Connor

(57) ABSTRACT

A method of hybrid automatic repeat request (HARQ) transmission includes: determining a target signal requiring a HARQ feedback; and feeding back an HARQ result corresponding to the target signal in a preset first HARQ feedback mode, in response to determining that the target signal contains a power saving signal.

3 Claims, 7 Drawing Sheets

HYBRID AUTOMATIC REPEAT REQUEST (HARQ) TRANSMISSION METHOD AND APPARATUS

CROSS-REFERENCE TO RELATED APPLICATION

This application is a national phase of International Application No. PCT/CN2019/093287, filed on Jun. 27, 2019, the content of which is hereby incorporated by reference in its entirety.

TECHNICAL FIELD

The disclosure relates to a field of communication technologies, and more particularly to a method of hybrid automatic repeat request (HARQ) transmission and an apparatus for HARQ transmission.

BACKGROUND

In standards for mobile telecommunications developed by the 3rd Generation Partnership Project (3GPP), a power saving signal is introduced in order to save power. A recent standard is known as 5G NR for "New Radio." Current power saving signals are designed based on New Radio-Physical Downlink Control Channel (NR-PDCCH), and application scenarios are provided as follows.

In NR protocols, a terminal does not need to monitor the PDCCH all the time, but specifies some specific times to monitor the PDCCH. In related arts, a time period during which the PDCCH needs to be monitored is defined as active time. The active time can be an on duration time in the DRX or PDCCH monitoring occasions configured by a base station. When the active time comes, the terminal will wake up to monitor the PDCCH.

SUMMARY

A method of HARQ transmission executed by a terminal includes: determining a target signal requiring a HARQ feedback; and feeding back a HARQ result corresponding to the target signal in a preset first HARQ feedback mode, in response to determining that the target signal contains a power saving signal.

A non-transitory computer-readable storage medium having a computer program stored thereon is provided. The computer program is configured to execute the above-mentioned method of HARQ transmission.

An apparatus of HARQ transmission for a terminal is provided. The apparatus includes: a processor and a memory for storing processor executable instructions.

The processor is configured to: determine a target signal requiring a HARQ feedback; and feedback a HARQ result corresponding to the target signal in a preset first HARQ feedback mode, in response to determining that the target signal contains a power saving signal.

It should be understood that the above general description and the following detailed description are only exemplary and explanatory, and do not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Figure 1:
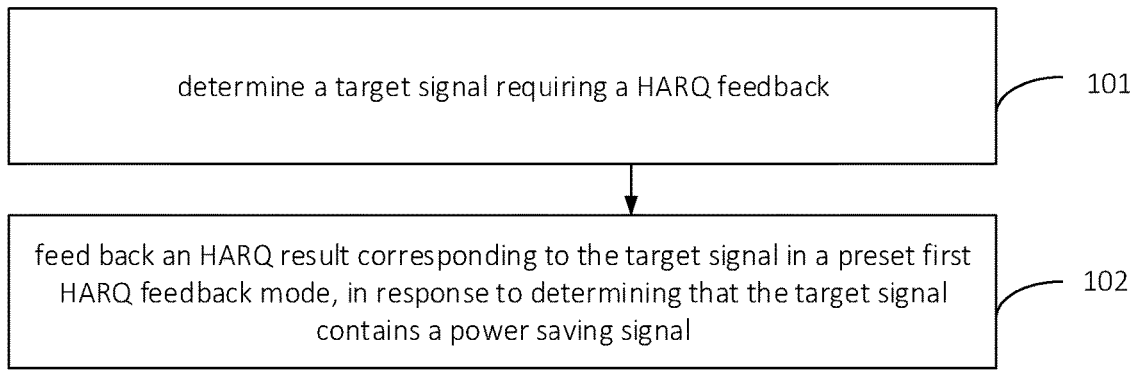
FIG. 1 is a flowchart illustrating a method of hybrid automatic repeat request (HARQ) transmission according to an exemplary embodiment.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the disclosure. The singular forms of "a", "said" and "the" used in the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, third, etc. may be used in this disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when" or "while" or "in response to determining".

When the terminal wakes up to monitor the PDCCH upon the active time comes, there is a case that the terminal does not have a corresponding service to execute during the active time, which means that the PDCCH monitoring during the active time wastes power. In this scenario, the power saving signal is introduced before the active time to prompt the terminal to wake up and monitor the PDCCH during the active time or to continue to sleep without waking up during the active time.

When a terminal wakes up for service interaction, a frequency of PDCCH monitoring, a bandwidth needed by the terminal for the monitoring, the number of receiving or transmitting antennas can all be configured flexibly. For example, when there are dense services and a large amount of data, a large bandwidth, more antennas and denser PDCCH monitoring can be configured. At the same time, these high configurations may consume a lot of power. On the contrary, when there are relatively sparse services, the base station can adjust the configuration, for example, allowing the terminal to monitor a small bandwidth, using fewer antennas for receiving and configuring sparser PDCCH monitoring. In this case, the power saving signal can be used to switch or reconfigure these configurations.

In addition, in the NR protocol, the terminal needs to perform the HARQ feedback on received Physical Downlink Shared Channel (PDSCH) or the PDCCH released by instructing the Semi-Persistent Scheduling (SPS). At the same time, the feedback can be performed for multiple transmissions in the NR, and multiple pieces of HARQ feedback information are encoded and put into a Physical Uplink Control Channel (PUCCH) for transmission. In related arts, the whole of the pieces of HARQ information that are fed back is called a codebook.

A size of the codebook in the NR can be semi-persistently configured by the base station. If the terminal is configured by the base station, with a codebook that is semi-persistently fed back, even if data schedule is not performed on a certain downlink subframe, NACK needs to be fed back for padding.

The existing power saving signal is generally before the on duration starts in Connected Discontinuous Reception (C-DRX) scenarios, and the base station will send the power saving signal to notify the user of waking up or continuing to sleep. In this scenario, there is generally no other data scheduling, and the HARQ feedback is generally only the feedback for the power saving signal. If the feedback is still performed based on the size of the codebook semi-persistently configured by the base station at this time, an additional overhead of uplink control resources will be wasted.

Embodiments of the disclosure provide a method of Hybrid Automatic Repeat Request (HARQ) transmission, which can be used in a terminal. FIG. 1 is a flowchart illustrating a method of HARQ transmission according to an exemplary embodiment. The method includes the following.

In block 101, a target signal requiring a HARQ feedback is determined.

In this block, the terminal can determine which signal has been received based on a receiving situation, and use the received signal as the target signal on which the HARQ feedback needs to be performed.

In block 102, a HARQ result corresponding to the target signal is fed back in a preset first HARQ feedback mode, in response to determining that the target signal contains a power saving signal.

In this block, if the target signal only contains the power saving signal, that is, the terminal receives only the power saving signal, the preset first HARQ feedback mode may be used to feed back the HARQ result corresponding to the target signal.

In the above embodiments, the terminal can determine the corresponding HARQ feedback mode based on the target signal that needs to feedback the HARQ result, thereby saving the overhead of the uplink control resources.

In an embodiment, in the above method according to embodiments of the disclosure, the terminal semi-persistently configures, based on an indication from the base station, a target bit number for bits occupied by a target codebook in advance. The target codebook is HARQ information fed back on a HARQ feedback resource. In embodiments of the disclosure, the target codebook includes the entire HARQ information that needs to be fed back by a HARQ feedback resource. For example, the target codebook can carry N HARQ feedbacks of the Physical Downlink Shared Channel (PDSCH), and the terminal pre-determines corresponding relationships between uplink subframes and downlink subframes with respect to the HARQ feedback in the target codebook, for example, the HARQ results of subframes 0, 1, 2, and 3 are fed back through the subframe 8.

In above embodiments, the terminal pre-configures, based on the indication from the base station, a target bit number for bits occupied by the target codebook. The target codebook is the HARQ information fed back on a HARQ feedback resource. In embodiments of the disclosure, the terminal can semi-persistently configure, based on the indication from the base station, the target bit number for bits occupied by the target codebook. Further, the terminal can still adopt different HARQ feedback modes for different target signals, thereby saving the overhead of the uplink control resources.

In an embodiment, if the target signal includes a power saving signal, then correspondingly, the target codebook includes the HARQ result corresponding to the power saving signal. In embodiments of the disclosure, in order to save the uplink control resources, the target codebook may not occupy the pre-configured target bit number, but only occupies 1 bit. That is, the target codebook only feeds back the HARQ result corresponding to the 1-bit power saving signal.

Correspondingly, the above block 102 includes: feeding back the HARQ result corresponding to the power saving signal through a Physical Uplink Control Channel (PUCCH) resource corresponding to a first target serial number, in which the PUCCH resource is from a PUCCH resource set that is pre-allocated to the terminal by the base station.

In the PUCCH resource set, the terminal feeds back only the HARQ result corresponding to the power saving signal through the PUCCH resource corresponding to the 1-bit first target serial number.

In above embodiments, if the target signal includes a power saving signal, the target codebook includes the HARQ result corresponding to the power saving signal, where the number of bits currently occupied by the target codebook is 1 which is not the target bit number of the target codebook that is pre-configured based on the indication from the base station. That is, if the target signal only includes the power saving signal, the target codebook only includes the HARQ result corresponding to the 1-bit power saving signal. Further, when the first HARQ feedback mode is used for feedback, in the PUCCH resource set pre-allocated to the terminal by the base station, the HARQ result corresponding to the power saving signal may be fed back through the PUCCH resource corresponding to the first target serial number, to realize a purpose of saving the overhead of the uplink control resources.

Figure 2:
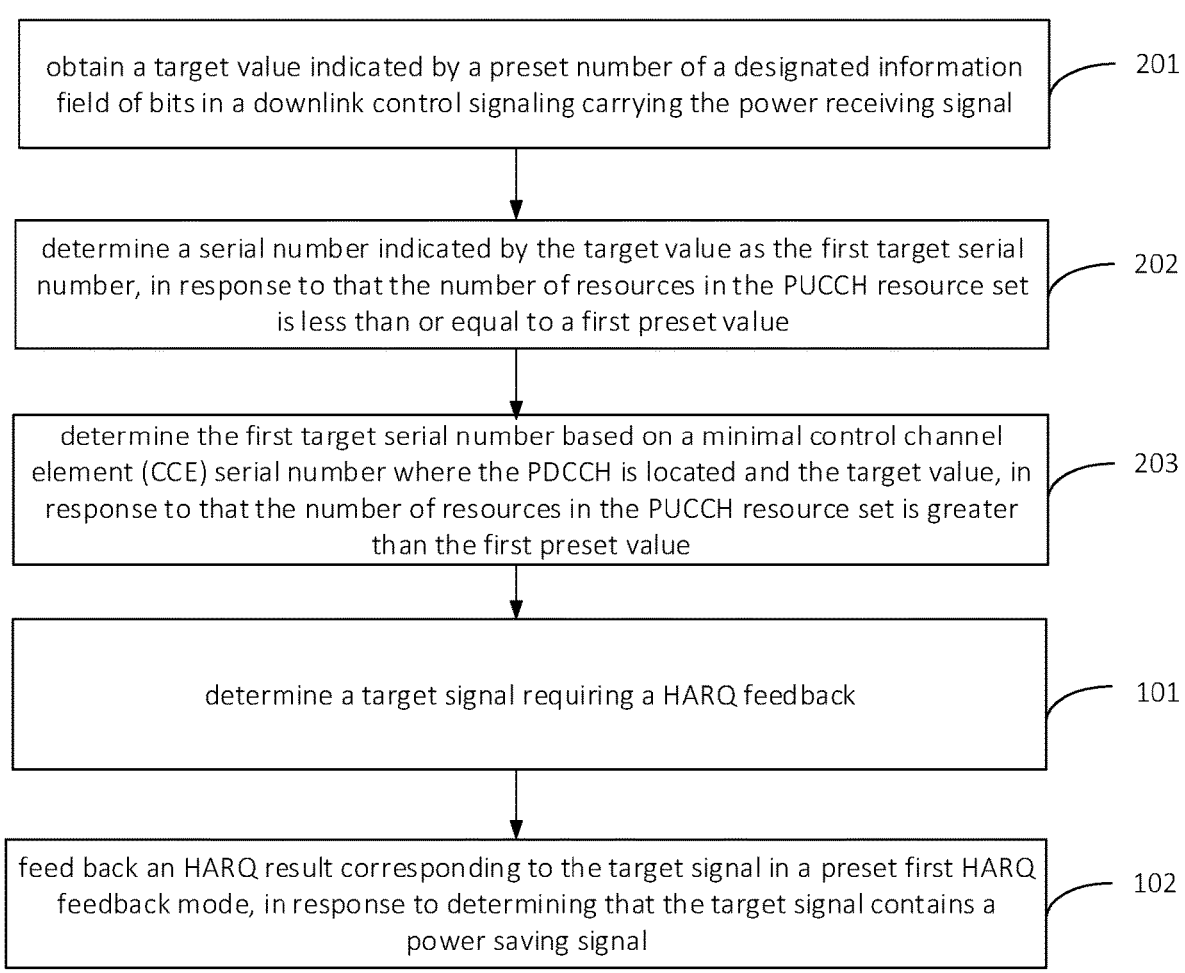
FIG. 2 is a flowchart illustrating another method of HARQ transmission according to an exemplary embodiment.

In an embodiment, as illustrated in FIG. 2, where FIG. 2 is a flowchart illustrated another method of HARQ transmission according to embodiments of FIG. 1, the process of determining the first target serial number by the terminal includes the following.

In block 201, a target value indicated by a preset number of bits of a designated information field is obtained in a downlink control signaling carrying the power receiving signal.

In embodiments of the disclosure, the preset number of bits may be 3, and the range of the target value indicated by the designated information field in the downlink control signaling may be 0 to 7.

In block 202, a serial number indicated by the target value is determined as the first target serial number, in response to that the number of resources in the PUCCH resource set is less than or equal to a first preset value.

In this block, optionally, the first preset value is 8. If the number of resources in the PUCCH resource set pre-allocated to the terminal by the base station is less than or equal to 8, the terminal can directly use the serial number indicated by the target value as the first target serial number. For example, if the target value is 6, the first target serial number is also 6.

In block 203, the first target serial number is determined based on the target value and a minimal Control Channel Element (CCE) serial number where the PDCCH is located, in response to that the number of resources in the PUCCH resource set is greater than the first preset value.

In this block, if the number of resources in the PUCCH resource set pre-allocated by the base station to the terminal is large and exceeds the first preset value, it is necessary to determine the first target serial number based on the number of the minimal CCE serial number where the PDCCH is located and the target value.

Optionally, the first target serial number $r_{PUCCH}^1$ is determined by a following formula:

$$r_{PUCCH}^1 = \begin{cases} \left\lfloor \frac{n_{CCE,p} \cdot \lceil R_{PUCCH}/8 \rceil}{N_{CCE,p}} \right\rfloor + \\ \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \\ \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases},$$

where $R_{PUCCH}$ is a size of the PUCCH resource set configured by the base station for the terminal, $N_{CCE,p}$ is a total number of CCEs occupied by the control field where the PDCCH is located, $N_{CCE,p}$ is the minimal CCE serial number where the PDCCH is located, and $\Delta_{PRI}$ is the target value indicated by the designated information field in the downlink control signaling.

In above embodiments, in determining the first target serial number, optionally, the terminal may obtain the target value indicated by a preset number of bits of a designated information field in the downlink control signaling carrying the power reception signal. If the number of resources in the PUCCH resource set is less than or equal to the first preset value, the terminal can directly determine the serial number indicated by the target value as the first target serial number. If the number of resources in the PUCCH resource set is greater than the first preset value, the terminal can determine the first target serial number based on the minimal CCE serial number where the PDCCH is located and the target value. Therefore, the process has a high availability.

Figure 3:
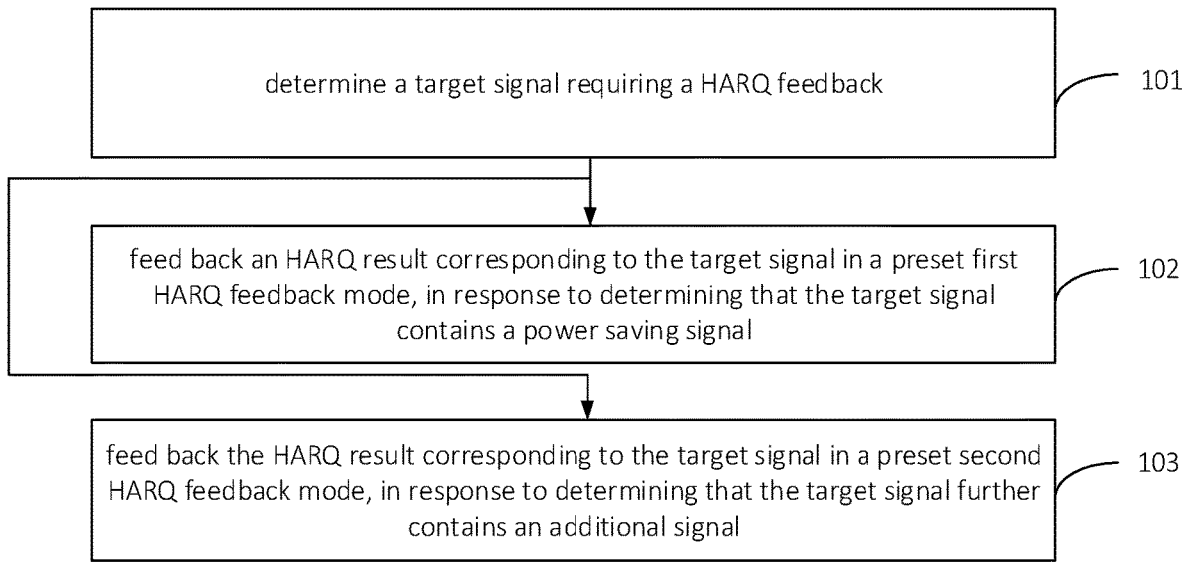
FIG. 3 is a flowchart illustrating another method of HARQ transmission according to an exemplary embodiment.

In an embodiment, as illustrated in FIG. 3, where FIG. 3 is a flowchart illustrating another method of HARQ transmission according to embodiments of FIG. 1. The method further includes the following.

In block 103, the HARQ result corresponding to the target signal is fed back in a preset second HARQ feedback mode, in response to determining that the target signal further contains an additional signal.

In this block, if the target signal further contains an additional signal other than the power saving signal, the HARQ result corresponding to the target signal is fed back by the terminal in the preset second HARQ feedback mode.

In above embodiments, if the terminal determines that the target signal that requires the HARQ feedback further contains an additional signal, the terminal may feedback the HARQ result corresponding to the target signal in the preset second HARQ feedback mode. In the above process, the terminal can determine the corresponding HARQ feedback mode based on the target signal that requires the feedback of the HARQ result, thereby saving the overhead of the uplink control resources.

In an embodiment, if the terminal determines that the target signal further contains an additional signal other than the power saving signal, correspondingly, the target codebook includes not only the HARQ result corresponding to the power saving signal, but also the HARQ result corresponding to the additional signal. Therefore, the number of bits currently occupied by the target codebook is the target bit number of the target codebook pre-configured by the terminal based on the indication from the base station.

Figure 4:
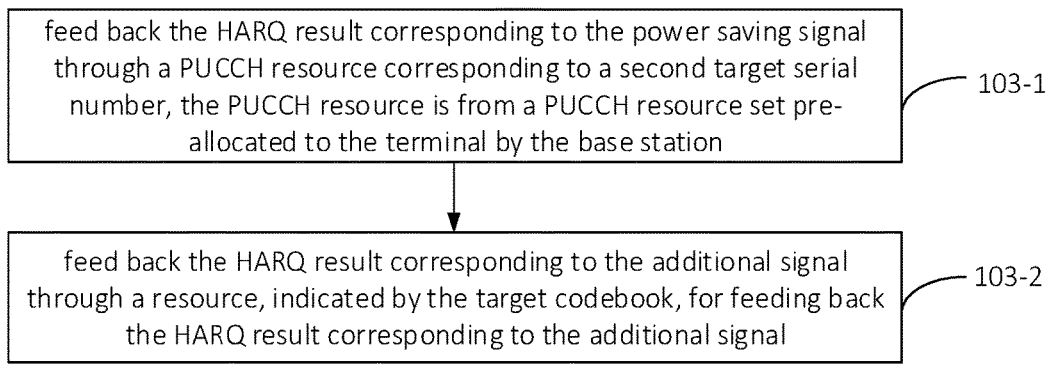
FIG. 4 is a flowchart illustrating another method of HARQ transmission according to an exemplary embodiment.

Correspondingly, as illustrated in FIG. 4, where FIG. 4 is a flowchart illustrating another method of HARQ transmission according to embodiments of FIG. 3, the block 103 may include the following.

In block 103-1, the HARQ result corresponding to the power saving signal is fed back through a PUCCH resource corresponding to a second target serial number, in which the PUCCH resource is from a PUCCH resource set pre-allocated to the terminal by the base station.

In this block, the terminal feeds back the HARQ result corresponding to the power saving signal through the PUCCH resource corresponding to the second target serial number.

In block 103-2, the HARQ result corresponding to the additional signal is fed back through a resource, indicated by the target codebook, for feeding back the HARQ result corresponding to the additional signal.

In this block, assuming the target codebook previously indicates that the HARQ results corresponding to subframes 0, 1, 2, and 3 are fed back on a subframe 8, the HARQ result of the additional signal (such as the subframes 0, 1, 2, and 3) is fed back through the subframe 8 indicated by the target codebook according to related arts.

In above embodiments, if the target signal further includes an additional signal in addition to the power saving signal, the target codebook includes not only the HARQ result corresponding to the power saving signal, but also the HARQ result corresponding to the additional signal, and the number of bits currently occupied by the target codebook is the target bit number of the target codebook pre-configured by the base station for the terminal. Further, in feeding back the HARQ result corresponding to the target signal by the terminal in the second HARQ feedback mode, the PUCCH resource corresponding to the second target serial number and from the PUCCH resource set that is pre-allocated to the terminal by the base station may be used to feed back the HARQ result corresponding to the power saving signal, and the additional signal is fed back through an existing mode in related arts, that is, the HARQ result corresponding to the additional signal is fed back through the resource indicated by the target codebook for feeding back the HARQ result corresponding to the additional signal. In the above process, different HARQ feedback modes are adopted for different target signals, which also achieves a purpose of saving the overhead of the uplink control resources.

It should be noted that if the target signal includes the additional signal in addition to the power saving signal and if a certain bit in the target codebook is not padded by the HARQ results, the bit needs to be padded with the NACK.

Figure 5:
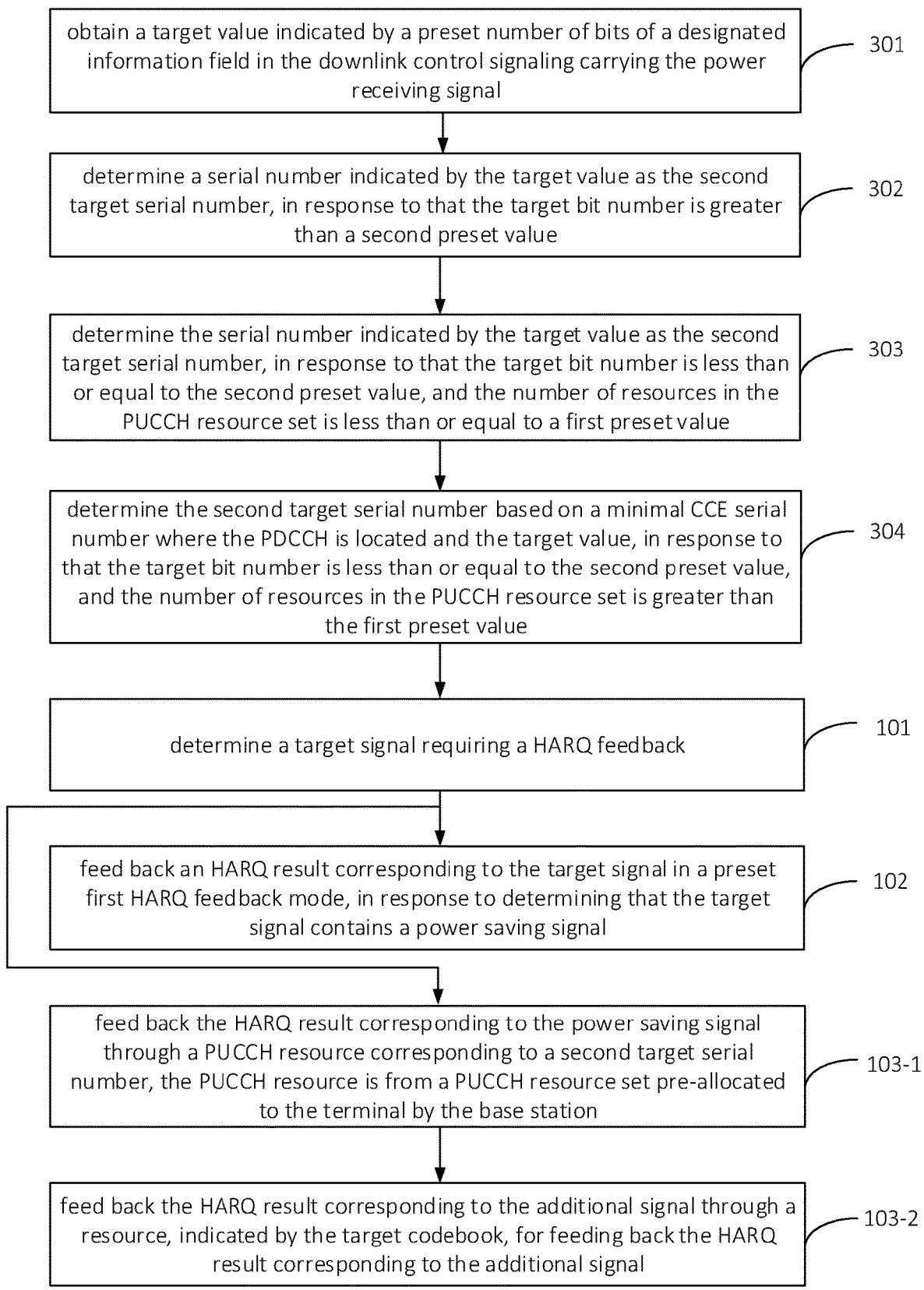
FIG. 5 is a flowchart illustrating another method of HARQ transmission according to an exemplary embodiment.

In an embodiment, as illustrated in FIG. 5, where FIG. 5 is a flowchart illustrating another method of HARQ transmission according to embodiments of FIG. 4, the process of determining the second target serial number by the terminal includes the following.

In block 301, a target value indicated by a preset number of bits of a designated information field in the downlink control signaling carrying the power receiving signal is obtained.

In embodiments of the disclosure, the preset number of bits may be 3, and the range of the target value indicated by the designated information field in the downlink control signaling may be 0 to 7.

In block 302, a serial number indicated by the target value is determined as the second target serial number, in response to that the target bit number is greater than a second preset value.

In this block, optionally, the second preset value is 2. If the number of bits occupied by the target codebook is greater than 2, and if the number of resources in the PUCCH resource set pre-configured by the base station for the terminal is at most 8, the serial number indicated by the target value can be directly determined as the second target serial number.

In block 303, the serial number indicated by the target value is determined as the second target serial number, in response to that the target bit number is less than or equal to the second preset value, and the number of resources in the PUCCH resource set is less than or equal to a first preset value.

In this block, if the number of bits occupied by the target codebook is 1 or 2, which is less than or equal to the second preset value, and the number of resources in the PUCCH resource set is less than or equal to the first preset value, the terminal can also directly determine the serial number indicated by the target value as the second target serial number.

In block 304, the second target serial number is determined based on a minimal CCE serial number where the PDCCH is located and the target value, in response to that the target bit number is less than or equal to the second preset value, and the number of resources in the PUCCH resource set is greater than the first preset value.

In this block, if the number of bits occupied by the target codebook is 1 or 2, which is less than or equal to the second preset value, and the number of resources in the PUCCH resource set is greater than the first preset value, the terminal can determine the second target serial number $r_{PUCCH}^2$ according to a following formula:

$$r_{PUCCH}^2 = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases},$$

where $R_{PUCCH}$ is a size of the PUCCH resource set configured by the base station for the terminal, $N_{CCE,p}$ is a total number of CCEs occupied by the control field where the PDCCH is located, $N_{CCE,p}$ is the minimal CCE serial number where the PDCCH is located, and $\Delta_{PRI}$ is the target value indicated by the designated information field in the downlink control signaling.

In above embodiments, in determining the second target serial number, if the target bit number of bits occupied by the target codebook pre-configured by the base station for the terminal is greater than the second preset value, the terminal may directly use the serial number indicated by the target value indicated by the preset number of bits of the designated information field in the downlink control signaling carrying the power reception signal as the second target serial number. If the target bit number is less than or equal to the second preset value, and the number of resources of the PUCCH resource set is less than or equal to the first preset value, the terminal can also determine the serial number indicated by the target value as the second target serial number. If the target bit number is less than or equal to the second preset value, and the number of resources in the PUCCH resource set is greater than the first preset value, the terminal can determine the second target serial number according to the minimal CCE serial number where the PDCCH is located and the target value. Therefore, the availability is high.

Corresponding to above embodiments of the application function realization method, the disclosure also provides embodiments of an application function realization apparatus and a corresponding terminal.

Figure 6:
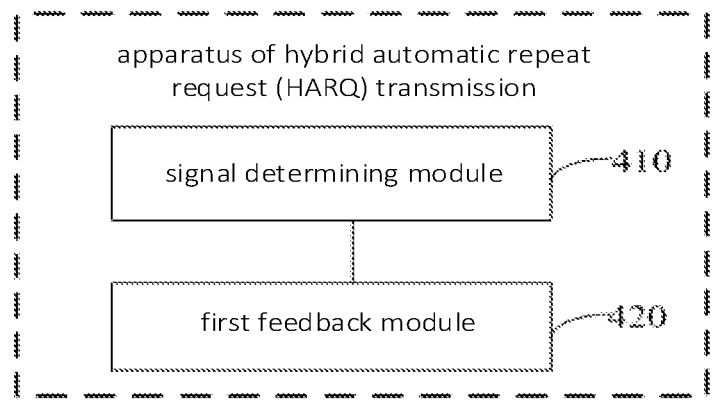
FIG. 6 is a block diagram illustrating an apparatus of HARQ transmission according to an exemplary embodiment.

As illustrated in FIG. 6, FIG. 6 is a block diagram illustrating an apparatus of hybrid automatic repeat request (HARQ) transmission according to an exemplary embodiment. The apparatus is used in a terminal and includes: a signal determining module 410 and a first feedback module 420.

The signal determining module 410 is configured to determine a target signal requiring a HARQ feedback.

The first feedback module 420 is configured to feed back a HARQ result corresponding to the target signal in a preset first HARQ feedback mode, in response to determining that the target signal contains a power saving signal.

Optionally, the terminal pre-configures, based on an indication from a base station, a target bit number for bits occupied by a target codebook, and the target codebook is HARQ information fed back by a HARQ feedback resource.

Optionally, the target codebook contains the HARQ result corresponding to the power saving signal, and the number of bits currently occupied by the target codebook is 1.

Figure 7:
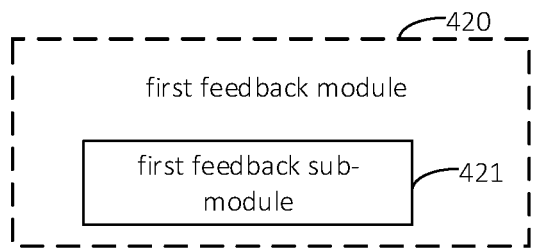
FIG. 7 is a block diagram illustrating another apparatus of HARQ transmission according to an exemplary embodiment.

As illustrated in FIG. 7, FIG. 7 is a block diagram illustrating another apparatus of hybrid automatic repeat request (HARQ) transmission based on embodiments shown in FIG. 6. The first feedback module 420 includes: a first feedback sub-module 421, configured to feed back the HARQ result corresponding to the power saving signal through a physical uplink control channel (PUCCH) resource corresponding to a first target serial number.

Figure 8:
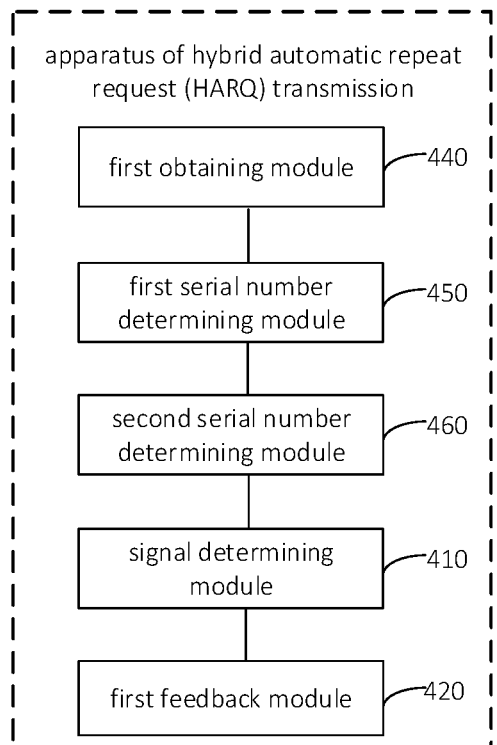
FIG. 8 is a block diagram illustrating another apparatus of HARQ transmission according to an exemplary embodiment.

As illustrated in FIG. 8, FIG. 8 is a block diagram illustrating another apparatus of hybrid automatic repeat request (HARQ) transmission based on embodiments shown in FIG. 6. The apparatus further includes: a first obtaining module 440, a first serial number determining module 450 and a second serial number determining module 460.

The first obtaining module 440 is configured to obtain a target value indicated by a preset number of bits of a designated information field in a downlink control signaling carrying the power receiving signal.

The first serial number determining module 450 is configured to determine a serial number indicated by the target value as the first target serial number, in response to that the number of resources in the PUCCH resource set is less than or equal to a first preset value.

The second serial number determining module 460 is configured to determine the first target serial number based on a minimal control channel element (CCE) serial number where the PDCCH is located and the target value, in response to that the number of resources in the PUCCH resource set is greater than the first preset value.

Figure 9:
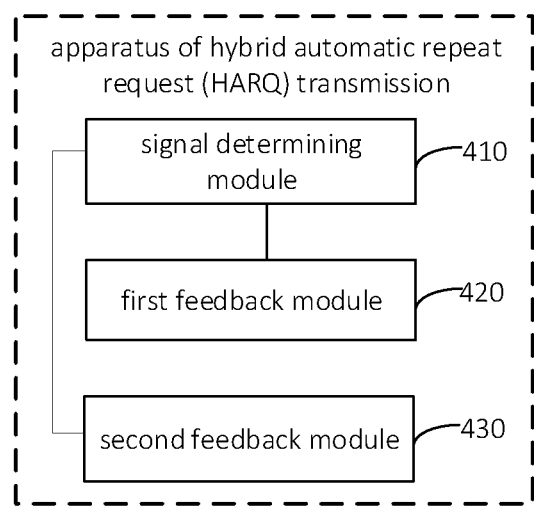
FIG. 9 is a block diagram illustrating another apparatus of HARQ transmission according to an exemplary embodiment.

As illustrated in FIG. 9, FIG. 9 is a block diagram illustrating another apparatus of hybrid automatic repeat request (HARQ) transmission based on embodiments shown in FIG. 6. The apparatus further includes: a second feedback module 430, configured to feed back the HARQ result corresponding to the target signal in a preset second HARQ feedback mode, in response to determining that the target signal further contains an additional signal.

Optionally, the target codebook includes a HARQ result corresponding to the additional signal, the number of bits currently occupied by the target codebook is the target bit number.

Figure 10:
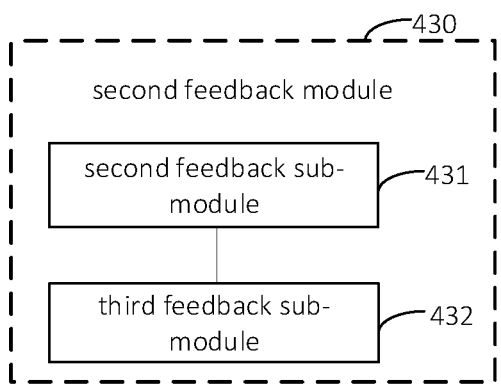
FIG. 10 is a block diagram illustrating another apparatus of HARQ transmission according to an exemplary embodiment.

As illustrated in FIG. 10, FIG. 10 is a block diagram illustrating another apparatus of hybrid automatic repeat request (HARQ) transmission based on embodiments shown in FIG. 9. the second feedback module 430 includes: a second feedback sub-module 431 and a third feedback sub-module 432.

The second feedback sub-module 431 is configured to feed back the HARQ result corresponding to the power saving signal through a physical uplink control channel (PUCCH) resource corresponding to a second target serial number.

The third feedback sub-module 432 is configured to feed back the HARQ result corresponding to the additional signal through a resource, indicated by the target codebook, for feeding back the HARQ result corresponding to the additional signal.

Optionally, each bit in the target codebook that is not occupied by the HARQ results is set as NACK.

Figure 11:
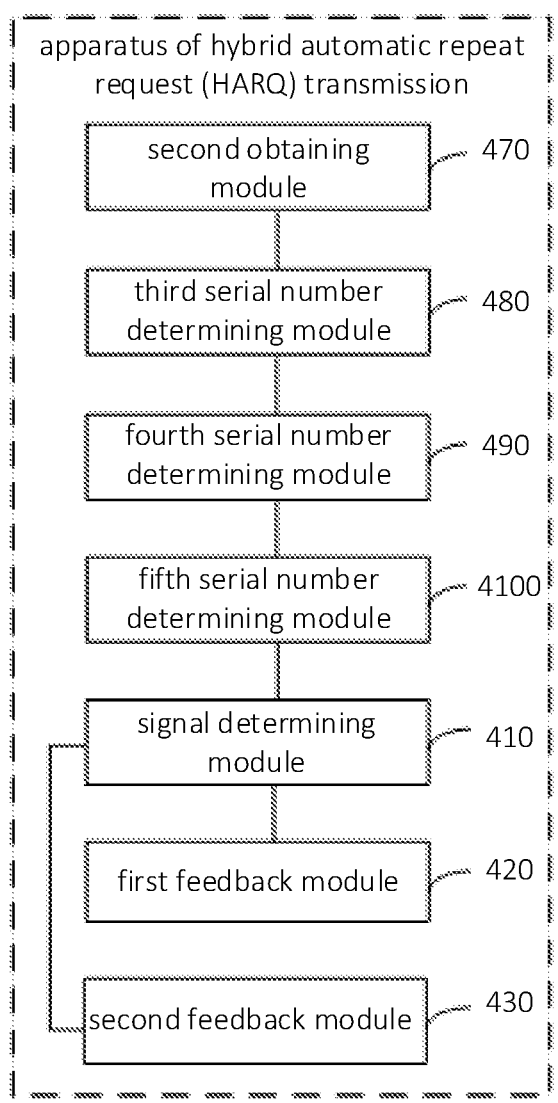
FIG. 11 is a block diagram illustrating another apparatus of HARQ transmission according to an exemplary embodiment.

As illustrated in FIG. 11, FIG. 11 is a block diagram illustrating another apparatus of hybrid automatic repeat request (HARQ) transmission based on embodiments shown in FIG. 10. The apparatus further includes: a second obtaining module 470, a third serial number determining module 480, a fourth serial number determining module 490 and a fifth serial number determining module 4100.

The second obtaining module 470 is configured to obtain a target value indicated by a designated information field of the preset number of bits in the downlink control signaling carrying the power receiving signal.

The third serial number determining module 480 is configured to determine a serial number indicated by the target value as the second target serial number, in response to that the target bit number is greater than a second preset value.

The fourth serial number determining module 490 is configured to determine the serial number indicated by the target value as the second target serial number, in response to that the target bit number is less than or equal to the second preset value, and the number of resources in the PUCCH resource set is less than or equal to a first preset value.

The fifth serial number determining module 4100 is configured to determine the second target serial number based on a minimal control channel element (CCE) serial number where the PDCCH is located and the target value, in response to that the target bit number is less than or equal to the second preset value, and the number of resources in the PUCCH resource set is greater than the first preset value.

Generally, the device embodiments correspond to the method embodiments, and the relevant part can refer to the part of the description of the method embodiments. The device embodiments described above are merely illustrative. The units described above as separate components may or may not be physically separated, and the components displayed as units may or may not be physical units, that is, the units may be located in one location, or can be distributed to multiple network units. Some or all of the modules can be selected according to actual needs to achieve the objectives of the solution of the disclosure. Those of ordinary skill in the art can understand and implement it without inventive works.

Correspondingly, in the disclosure, a computer-readable storage medium having a computer program stored thereon is provided. The computer program is configured to execute the method of hybrid automatic repeat request (HARQ) transmission according to any one of the embodiments.

Correspondingly, in the disclosure, an apparatus of hybrid automatic repeat request (HARQ) transmission for a terminal is provided. The apparatus includes: a processor and a memory for storing processor executable instructions.

The processor is configured to: determine a target signal requiring a HARQ feedback; and feedback a HARQ result corresponding to the target signal in a preset first HARQ feedback mode, in response to determining that the target signal contains a power saving signal.

Figure 12:
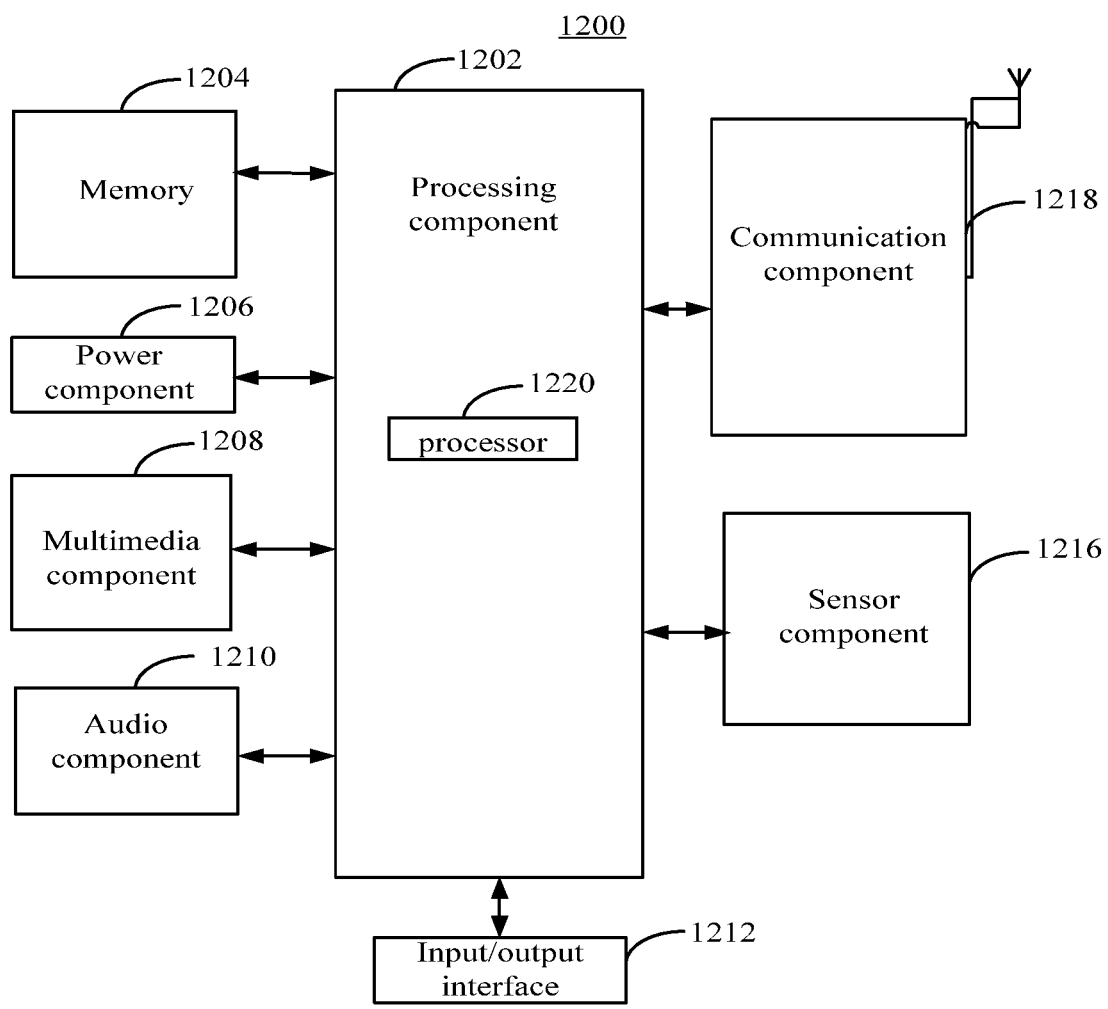
FIG. 12 is a block diagram illustrating an apparatus of HARQ transmission according to an exemplary embodiment.

FIG. 12 is a block diagram of an electronic device 1200 according to an exemplary embodiment. For example, the electronic device 1200 may be a terminal such as a mobile phone, a tablet computer, an e-book reader, a multimedia playback device, a wearable device, and a vehicle-mounted terminal.

As illustrated in FIG. 12, the electronic device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 generally controls overall operations of the electronic device 1200, such as the operations associated with display, telephone calls, data communications, camera operations, and recording operations. The processing component 1202 may include one or more processors 1220 to execute instructions to perform all or part of the steps in the above described method. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202. For another example, the processing component 1202 may read executable instructions from the memory to implement the steps of the method of hybrid automatic repeat request (HARQ) transmission provided by the foregoing embodiments.

The memory 1204 is configured to store various types of data to support the operation of the electronic device 1200. Examples of such data include instructions for any applications or methods operated on the electronic device 1200, contact data, phonebook data, messages, pictures, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the electronic device 1200. The power component 1206 may include a power management system, one or more power sources, and any other components associated with the generation, management, and distribution of power in the electronic device 1200.

The multimedia component 1208 includes a screen providing an output interface between the electronic device 1200 and the user. In some embodiments, the multimedia component 1208 includes a front camera and/or a rear camera. When the electronic device 1200 is in an operation mode, such as a shooting mode or a video mode, the front camera and/or the rear camera can receive external multimedia data. Each front camera and rear camera can be a fixed optical lens system or have focal length and optical zoom capabilities.

The audio component 1210 is configured to output and/or input audio signals. For example, the audio component 1210 includes a microphone (MIC) configured to receive an external audio signal when the electronic device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1216 includes one or more sensors to provide status assessments of various aspects of the electronic device 1200. For instance, the sensor component 1216 may detect an open/closed status of the electronic device 1200, relative positioning of components, e.g., the display and the keypad, of the electronic device 1200, a change in position of the electronic device 1200 or a component of the electronic device 1200, a presence or absence of user contact with the electronic device 1200, an orientation or an acceleration/deceleration of the electronic device 1200, and a change in temperature of the electronic device 1200. The sensor component 1216 may include a proximity sensor configured to detect the presence of nearby objects without any physical contact. The sensor component 1216 may also include a light sensor, such as a CMOS or CCD image sensor, for use in imaging applications. In some embodiments, the sensor component 1216 may also include an accelerometer sensor, a gyroscope sensor, a magnetic sensor, a pressure sensor, or a temperature sensor.

The communication component 1218 is configured to facilitate communication, wired or wirelessly, between the electronic device 1200 and other devices. The electronic device 1200 can access a wireless network based on a communication standard, such as WiFi, 2G, or 3G, or a combination thereof. In an exemplary embodiment, the communication component 1216 receives a broadcast signal or broadcast associated information from an external broadcast management system via a broadcast channel. In an exemplary embodiment, the communication component 1218 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the electronic device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 1204, executable by the processor 1220 in the electronic device 1200, for performing the above method. For example, the non-transitory computer-readable storage medium may be a ROM, a RAM, a CD-ROM, a magnetic tape, a floppy disc, an optical data storage device, and the like.

In embodiments of the disclosure, if it is determined that the target signal that requires HARQ feedback includes a power reception signal, a HARQ result corresponding to the target signal is fed back by the terminal in a preset first HARQ feedback mode. In the above process, the terminal can determine the corresponding HARQ feedback mode according to the target signal of the HARQ result, thereby saving the overhead of the uplink control resources.

In embodiments of the disclosure, the terminal pre-configures, based on an indication from a base station, a target bit number for bits occupied by a target codebook.

The target codebook is HARQ information fed back on a HARQ feedback resource. In the embodiments of the disclosure, the terminal can semi-persistently configures, based on the indication from the base station, the target bit number for bits occupied by the target codebook. Further, the terminal can still adopt different HARQ feedback modes for different target signals, thereby achieving the purpose of saving the overhead of the uplink control resources.

In embodiments of the disclosure, the target codebook contains the HARQ result corresponding to the power saving signal. The number of bits currently occupied by the target codebook is 1, instead of the target bit number of the target codebook previously configured for the terminal by the base station. That is, if the target signal contains the power saving signal, the target codebook includes the HARQ result corresponding to 1 bit of power saving signal. Further, when the feedback is performed in the first HARQ feedback mode, in the PUCCH resource set pre-allocated to the terminal by the base station, the HARQ result corresponding to the power saving signal may be fed back through the PUCCH resource corresponding to the first target serial number, to achieve the purpose of saving the overhead of uplink control resources.

In embodiments of the disclosure, in determining the first target serial number, optionally, the terminal may obtain the target value indicated by a preset number of bits of a designated information field in the downlink control signaling carrying the power reception signal. If the number of resources in the PUCCH resource set is less than or equal to the first preset value, the terminal may directly determine the serial number indicated by the target value as the first target serial number. If the number of resources in the PUCCH resource set is greater than the first preset value, the terminal can determine the first target serial number based on a minimal control channel element (CCE) serial number where the PDCCH is located and the target value, the process has a high availability.

In embodiments of the disclosure, if the terminal determines that the target signal further contains an additional signal, the terminal may feedback the HARQ result corresponding to the target signal in the preset second HARQ feedback mode. In the above process, the terminal can determine the corresponding HARQ feedback mode according to the target signal that requires the feedback of the HARQ result, thereby saving the overhead of the uplink control resources.

In embodiments of the disclosure, the target codebook contains a HARQ result corresponding to the additional signal. The number of bits currently occupied by the target codebook is the target bit number pre-configured by the terminal based on the indication from the base station. Further, in feeding back the HARQ result corresponding to the target signal by the terminal in the second HARQ feedback mode, the PUCCH resource corresponding to the second target serial number and from the PUCCH resource set that is pre-allocated to the terminal by the base station may be used to feed back the HARQ result corresponding to the power saving signal. The HARQ result corresponding to the power saving signal is fed back through the PUCCH resource corresponding to the second target serial number, and the additional signal is still fed back in the manner in the related art, and the additional signal is fed back through an existing mode in related arts. That is, the HARQ result corresponding to the additional signal is fed back through the resource indicated by the target codebook for feeding back the HARQ result corresponding to the additional signal. In the above process, different HARQ feedback modes are adopted for different target signals, which also achieves the purpose of saving the overhead of the uplink control resources.

In embodiments of the disclosure, if the target signal contains the additional signal, each bit in the target codebook that is not occupied by the HARQ results is set as NACK, the process has high availability.

In embodiments of the disclosure, when determining the second target serial number, if the target bit number of bits occupied by the target codebook pre-configured by the terminal is greater than the second preset value, the terminal may directly use the serial number indicated by the target value indicated by a preset number of bits of a designated information field in the downlink control signaling carrying the power reception signal as the second target serial number. If the target bit number is less than or equal to the second preset value, the number of resources of the PUCCH resource set is less than or equal to the first preset value, the terminal may also determine the serial number indicated by the target value as the second target serial number. If the target bit number is less than or equal to the second preset value, and the number of resources in the PUCCH resource set is greater than the first preset value, the terminal can determine the second target serial number based on the minimal CCE serial number where the PDCCH is located and the target value, which has high availability.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method of hybrid automatic repeat request (HARQ) transmission, executed by a terminal, comprising:
   determining a target signal requiring a HARQ feedback; and feeding back a HARQ result corresponding to the target signal in a preset first HARQ feedback mode, in response to determining that the target signal contains a power saving signal, wherein a target codebook contains a HARQ result corresponding to the power saving signal, and a number of bits currently occupied by the target codebook is 1;
   feeding back the HARQ result corresponding to the target signal in a preset second HARQ feedback mode, in response to determining that the target signal further contains a signal other than the power saving signal, wherein the target codebook comprises a HARQ result corresponding to the power saving signal and a HARQ result corresponding to the signal other than the power saving signal, the number of bits currently occupied by the target codebook is a target bit number pre-configured by the terminal based on an indication from a base station;
   wherein the target codebook is HARQ information fed back by a HARQ feedback resource;
   wherein feeding back the HARQ result corresponding to the target signal in the preset first HARQ feedback mode, comprises:
   feeding back the HARQ result corresponding to the power saving signal through a physical uplink control channel (PUCCH) resource corresponding to a first target serial number, wherein the PUCCH resource is from a PUCCH resource set pre-allocated to the terminal by the base station;
   the method further comprising: determining the first target serial number by:
   obtaining a target value indicated by a preset number of bits of a designated information field in a downlink control signaling carrying the power saving signal;
   determining a serial number indicated by the target value as the first target serial number, in response to that the number of resources in the PUCCH resource set is less than or equal to a first preset value; and
   determining the first target serial number based on a minimal control channel element (CCE) serial number where a physical downlink control channel (PDCCH) is located and the target value, in response to that the number of resources in the PUCCH resource set is greater than the first preset value;

wherein feeding back the HARQ result corresponding to the target signal in the preset second HARQ feedback mode, comprises:

feeding back the HARQ result corresponding to the power saving signal through a PUCCH resource corresponding to a second target serial number, wherein the PUCCH resource is from a PUCCH resource set pre-allocated to the terminal by the base station; and feeding back the HARQ result corresponding to the signal other than the power saving signal through a resource, indicated by the target codebook, for feeding back the HARQ result corresponding to the signal other than the power saving signal; wherein each bit in the target codebook that is not occupied by the HARQ result is set as NACK;

the method further comprising, determining the second target serial number by:

obtaining a target value indicated by a preset number of bits of a designated information field in a downlink control signaling carrying the power saving signal;

determining a serial number indicated by the target value as the second target serial number, in response to that the target bit number is greater than a second preset value;

determining the serial number indicated by the target value as the second target serial number, in response to that the target bit number is less than or equal to the second preset value, and the number of resources in the PUCCH resource set is less than or equal to a first preset value; and determining the second target serial number based on a minimal CCE serial number where the PDCCH is located and the target value, in response to that the target bit number is less than or equal to the second preset value, and the number of resources in the PUCCH resource set is greater than the first preset value.

2. A non-transitory computer-readable storage medium having a computer program stored thereon, wherein the computer program is configured to execute the method of hybrid automatic repeat request (HARQ) transmission, the method comprises:

determining a target signal requiring a HARQ feedback; and feeding back a HARQ result corresponding to the target signal in a preset first HARQ feedback mode, in response to determining that the target signal contains a power saving signal, wherein a target codebook contains a HARQ result corresponding to the power saving signal, and a number of bits currently occupied by the target codebook is 1;

feeding back the HARQ result corresponding to the target signal in a preset second HARQ feedback mode, in response to determining that the target signal further contains a signal other than the power saving signal;

wherein the target codebook comprises a HARQ result corresponding to the power saving signal and a HARQ result corresponding to the signal other than the power saving signal, the number of bits currently occupied by the target codebook is a target bit number pre-configured by the terminal based on an indication from a base based station;

wherein the target codebook is HARQ information fed back by a HARQ feedback resource;

wherein feeding back the HARQ result corresponding to the target signal in the preset first HARQ feedback mode, comprises:

feeding back the HARQ result corresponding to the power saving signal through a physical uplink control channel (PUCCH) resource corresponding to a first target serial number, wherein the PUCCH resource is from a PUCCH resource set pre-allocated to the terminal by the base station;

the method further comprising: determining the first target serial number by:

obtaining a target value indicated by a preset number of bits of a designated information field in a downlink control signaling carrying the power saving signal;

determining a serial number indicated by the target value as the first target serial number, in response to that the number of resources in the PUCCH resource set is less than or equal to a first preset value; and determining the first target serial number based on a minimal control channel element (CCE) serial number where a physical downlink control channel (PDCCH) is located and the target value, in response to that the number of resources in the PUCCH resource set is greater than the first preset value;

wherein feeding back the HARQ result corresponding to the target signal in the preset second HARQ feedback mode, comprises:

feeding back the HARQ result corresponding to the power saving signal through a PUCCH resource corresponding to a second target serial number, wherein the PUCCH resource is from a PUCCH resource set pre-allocated to the terminal by the base station; and feeding back the HARQ result corresponding to the signal other than the power saving signal through a resource, indicated by the target codebook, for feeding back the HARQ result corresponding to the signal other than the power saving signal; wherein each bit in the target codebook that is not occupied by the HARQ result is set as NACK;

the method further comprising, determining the second target serial number by:

obtaining a target value indicated by a preset number of bits of a designated information field in the downlink control signaling carrying the power saving signal;

determining a serial number indicated by the target value as the second target serial number, in response to that the target bit number is greater than a second preset value;

determining the serial number indicated by the target value as the second target serial number, in response to that the target bit number is less than or equal to the second preset value, and the number of resources in the PUCCH resource set is less than or equal to a first preset value; and determining the second target serial number based on a minimal CCE serial number where the PDCCH is located and the target value, in response to that the target bit number is less than or equal to the second preset value, and the number of resources in the PUCCH resource set is greater than the first preset value.

3. An apparatus of hybrid automatic repeat request (HARQ) transmission, integrated into a terminal, comprising:

a processor;

a memory for storing processor executable instructions; wherein, the processor is configured to:

determine a target signal requiring a HARQ feedback; and feed back a HARQ result corresponding to the target signal in a preset first HARQ feedback mode, in response to determining that the target signal contains a power saving signal, wherein a target codebook contains a HARQ result corresponding to the power saving signal, and a number of bits currently occupied by the target codebook is 1;

feed back the HARQ result corresponding to the target signal in a preset second HARQ feedback mode, in response to determining that the target signal further contains a signal other than the power saving signal, wherein the target codebook comprises a HARQ result corresponding to the power saving signal and a HARQ result corresponding to the signal other than the power saving signal, the number of bits currently occupied by the target codebook is a target bit number pre-configured by the terminal based on an indication from a base station;

wherein the target codebook is HARQ information fed back by a HARQ feedback resource;

wherein the processor is further configured to:

feed back the HARQ result corresponding to the power saving signal through a physical uplink control channel (PUCCH) resource corresponding to a first target serial number, wherein the PUCCH resource is from a PUCCH resource set pre-allocated to the terminal by the base station;

wherein the processor is further configured to:

obtain a target value indicated by a preset number of bits of a designated information field in the downlink control signaling carrying the power saving signal;

determine a serial number indicated by the target value as the first target serial number, in response to that the number of resources in the PUCCH resource set is less than or equal to a first preset value; and determine the first target serial number based on a minimal control channel element (CCE) serial number where a physical downlink control channel (PDCCH) is located and the target value, in response to that the number of resources in the PUCCH resource set is greater than the first preset value;

wherein the processor is further configured to:

feed back the HARQ result corresponding to the power saving signal through a PUCCH resource corresponding to a second target serial number, wherein the PUCCH resource is from a PUCCH resource set pre-allocated to the terminal by the base station; and feed back the HARQ result corresponding to the signal other than the power saving signal through a resource, indicated by the target codebook, for feeding back the HARQ result corresponding to the signal other than the power saving signal; wherein each bit in the target codebook that is not occupied by the HARQ result is set as NACK; and wherein the processor is further configured to:

obtain a target value indicated by a preset number of bits of a designated information field in the downlink control signaling carrying the power saving signal;

determine a serial number indicated by the target value as the second target serial number, in response to that the target bit number is greater than a second preset value;

determine the serial number indicated by the target value as the second target serial number, in response to that the target bit number is less than or equal to the second preset value, and the number of resources in the PUCCH resource set is less than or equal to a first preset value; and determine the second target serial number based on a minimal CCE serial number where the PDCCH is located and the target value, in response to that the target bit number is less than or equal to the second preset value, and the number of resources in the PUCCH resource set is greater than the first preset value.

* * * * *